(12) United States Patent
Tutmark

(10) Patent No.: US 8,602,914 B2
(45) Date of Patent: Dec. 10, 2013

(54) METHODS AND SYSTEMS FOR CUSTOMIZING A GOLF BALL

(75) Inventor: Bradley C. Tutmark, Aloha, OR (US)

(73) Assignee: NIKE, Inc., Beaverton, OR (US)

(*) Notice: Subject to any disclaimer, the term of this patent is extended or adjusted under 35 U.S.C. 154(b) by 695 days.

(21) Appl. No.: 12/690,493

(22) Filed: Jan. 20, 2010

(65) Prior Publication Data

US 2011/0177890 A1 Jul. 21, 2011

(51) Int. Cl.
*A63B 37/00* (2006.01)

(52) U.S. Cl.
USPC .......................................................... 473/351

(58) Field of Classification Search
USPC .................. 473/351–377, 251–277
See application file for complete search history.

(56) References Cited

U.S. PATENT DOCUMENTS

| | | | |
|---|---|---|---|
| 4,839,116 A | 6/1989 | Puckett et al. | |
| 4,844,427 A | 7/1989 | Pedersen | |
| 5,131,662 A | 7/1992 | Pollitt | |
| 5,542,677 A * | 8/1996 | Sullivan et al. | 473/385 |
| 5,580,927 A * | 12/1996 | Chou et al. | 525/201 |
| 5,789,475 A * | 8/1998 | Chen | 524/300 |
| 5,795,247 A * | 8/1998 | Yokota et al. | 473/374 |
| 5,810,677 A * | 9/1998 | Maruko et al. | 473/357 |
| 5,948,864 A * | 9/1999 | Rajagopalan | 525/132 |
| 5,959,059 A * | 9/1999 | Vedula et al. | 528/76 |
| 5,971,871 A * | 10/1999 | Sullivan et al. | 473/373 |
| 5,981,654 A * | 11/1999 | Rajagopalan | 525/66 |
| 6,180,040 B1 | 1/2001 | Ladd et al. | |
| 6,207,095 B1 | 3/2001 | Gosetti | |
| 6,369,125 B1 * | 4/2002 | Nesbitt | 522/142 |
| 6,846,898 B2 * | 1/2005 | Yokota | 528/65 |
| 6,936,205 B2 | 8/2005 | Cavallaro et al. | |
| 7,378,144 B2 | 5/2008 | DeMeo et al. | |
| 8,273,845 B2 * | 9/2012 | Meltzer et al. | 528/74.5 |
| 2003/0153410 A1 | 8/2003 | Shimosaka | |
| 2004/0192469 A1 | 9/2004 | Peterson | |

(Continued)

FOREIGN PATENT DOCUMENTS

| | | | | |
|---|---|---|---|---|
| DE | 3803810 A1 * | 8/1989 | | C08L 75/04 |
| DE | 4014164 A1 * | 11/1991 | | B29C 71/00 |

(Continued)

OTHER PUBLICATIONS

Drobny, Jiri George; Handbook of Thermoplastic Elastomers; William Andrew, 2007; ISBN 0815515499; pp. 29-154.

(Continued)

*Primary Examiner* — Alvin Hunter
(74) *Attorney, Agent, or Firm* — Plumsea Law Group, LLC

(57) ABSTRACT

A method for customizing a golf ball, and associated kits, are provided. The method includes steps of heating a golf ball that has a semi-crystalline thermoplastic polymer material making up the cover layer, and then cooling the golf ball at a preselected rate so as to change the degree of crystallinity. The change in degree of crystallinity allows the golf ball to achieve different play characteristics. The change is reversible by repeating the method, and the method may be repeated many times using the same golf ball. Kits used to carry out the method may include a golf ball having a semi-crystalline thermoplastic polymer material for the cover layer, a graphical representation of how the cooling relates to the desired play characteristics, a stand for holding the golf ball, a heater, and an additive that aids in heating or cooling the golf ball.

10 Claims, 9 Drawing Sheets

(56) References Cited

U.S. PATENT DOCUMENTS

| | | |
|---|---|---|
| 2005/0079929 A1 | 4/2005 | Tzivanis et al. |
| 2006/0166761 A1 | 7/2006 | Kim et al. |
| 2008/0136056 A1 | 6/2008 | Scolamiero et al. |
| 2008/0251400 A1 | 10/2008 | Ulrich |
| 2009/0163297 A1 | 6/2009 | Rajagopalan et al. |
| 2009/0192262 A1* | 7/2009 | Meltzer et al. ............ 524/590 |

FOREIGN PATENT DOCUMENTS

| | | |
|---|---|---|
| JP | 4156865 A | 5/1992 |
| JP | 2006-312043 | 11/2006 |
| JP | 5209065 | 3/2013 |
| TW | 200936693 A | 9/2009 |
| WO | WO2004064935 A2 | 8/2004 |
| WO | WO2008042416 A1 | 4/2008 |

OTHER PUBLICATIONS

Office Action for Chinese Invention Patent Application No. 201110025907.X mailed on Feb. 20, 2013.
Decision to Grant a Patent for Japanese Patent Application No. 2011-003997 mailed on Jan. 9, 2013.
Extended European Search Report and Written Opinion in European Patent Application No. EP11150673.9, mailed on Mar. 25, 2011.
Communication under Rule 71(3) EPC in European Patent Application No. EP11150673.9, mailed on May 22, 2012.
Office Action in Japanese Patent Application No. 2011-003997, mailed on Sep. 12, 2012.
Response to Office Action issued Feb. 20, 2013 for Chinese Invention Patent Application No. 201110025907.X, as filed on May 31, 2013 and the English translation thereof.
Official Letter and Search Report mailed Apr. 24, 2013 for Taiwanese Patent Application No. 99145838.

* cited by examiner

| COOLING PROCESS | HARDNESS VALUE | SPIN | PLAY CHARACTERISTICS ACHIEVED: |
|---|---|---|---|
| FINISHED GOLF BALL, OUT OF THE BOX BEFORE HEATING | 60D | MEDIUM | ALL AROUND PLAY |
| COLD (4 TO 13° C) WATER QUENCH FOR 1 TO 5 MINUTES | 57-58D | HIGHER | BETTER CONTROL, USE IN COLD OR WET WEATHER |
| WARM (49 TO 70° C) WATER BATH FOR 1 TO 10 MINUTES | 62-63D | LOWER | GREATER DISTANCE FOR LONG COURSES |

METHODS AND SYSTEMS FOR CUSTOMIZING A GOLF BALL

BACKGROUND

The present disclosure relates generally to a method of customizing the play characteristics of a golf ball.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Similarly, a golfer may use different golf balls having different play characteristics depending on the golfer's preferences. For example, different dimple patterns may affect the aerodynamic properties of the golf ball during flight, or a difference in the hardness may affect the rate of backspin. With regard to hardness in particular, a golfer may choose to use a golf ball having a cover layer and/or a core that is harder or softer. A golf ball having cover layer that is harder will generally achieve greater distances but less spin, and so will be better for drives but more difficult to control on shorter shots. On the other hand, a golf ball having a cover layer that is softer will generally experience more spin and therefore be easier to control, but will lack distance.

Amateur golfers generally prefer to minimize the costs of purchasing new golf balls. However, a golfer may be required to purchase several sets of golf balls in order to achieve different play characteristics. For example, a golfer may purchase and use a set of hard golf balls for use specifically on longer courses, when the improved distance achieved by hard golf balls will be advantageous. In addition, a golfer may purchase and use a set of soft golf balls for use on shorter courses, or for use under conditions requiring increased control such as cold or wet weather. The need to purchase, store and carry several sets of golf balls in order to achieve a variety of play characteristics presents an inconvenience to the golfer, as well as increased costs.

Therefore, there is a need in the art for a system and method that addresses the shortcomings of the prior art discussed above.

SUMMARY

In one aspect, the present disclosure provides a method of customizing a golf ball, the method comprising the steps of (1) providing a golf ball comprising a core and a cover layer substantially disposed around the core, the cover layer being formed of a semi-crystalline thermoplastic polymer material; (2) heating the golf ball to a preselected temperature; and (3) cooling the golf ball at a preselected rate so as to control the degree of crystallinity formed in the semi-crystalline thermoplastic polymer material.

In another aspect the present disclosure provides a method of customizing a golf ball, the method comprising the steps of: (1) providing a golf ball to a consumer, the golf ball comprising a core and a cover layer substantially disposed around the core, the cover layer being formed of a semi-crystalline thermoplastic polymer material; (2) indicating to the consumer to: heat the golf ball to a preselected temperature, and then cool the golf ball at a preselected rate so as to cause the golf ball to exhibit a desired play characteristic when hit by a golf club.

Furthermore, in another aspect the present disclosure provides a kit comprising: at least one finished golf ball, the at least one finished golf ball comprising a core and a cover layer substantially disposed around the core, the cover layer being formed of a semi-crystalline thermoplastic polymer material; wherein the cover layer is configured to be customized by an end user according to a preselected rate of cooling, after the golf ball has been heated to a preselected temperature, so as to achieve a desired play characteristic; a graphical representation of a correlation between at least one preselected rate of cooling the golf ball, after the golf ball has been heated to a preselected temperature, and a desired play characteristic exhibited by the golf ball when hit by a golf club; and an additive, which aids in heating the golf ball or cooling the golf ball.

Other systems, methods, features and advantages of the present disclosure will be, or will become, apparent to one of ordinary skill in the art upon examination of the following figures and detailed description. It is intended that all such additional systems, methods, features and advantages be included within this description and this summary, be within the scope of the present disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 7 is a sample chart relating the preselected cooling rates to various resulting play characteristics;

DETAILED DESCRIPTION

Generally, the present disclosure provides methods for customizing a golf ball, in particular customizing the hardness of a golf ball cover layer, and associated kits that may be used to carry out the methods.

Figure 1:
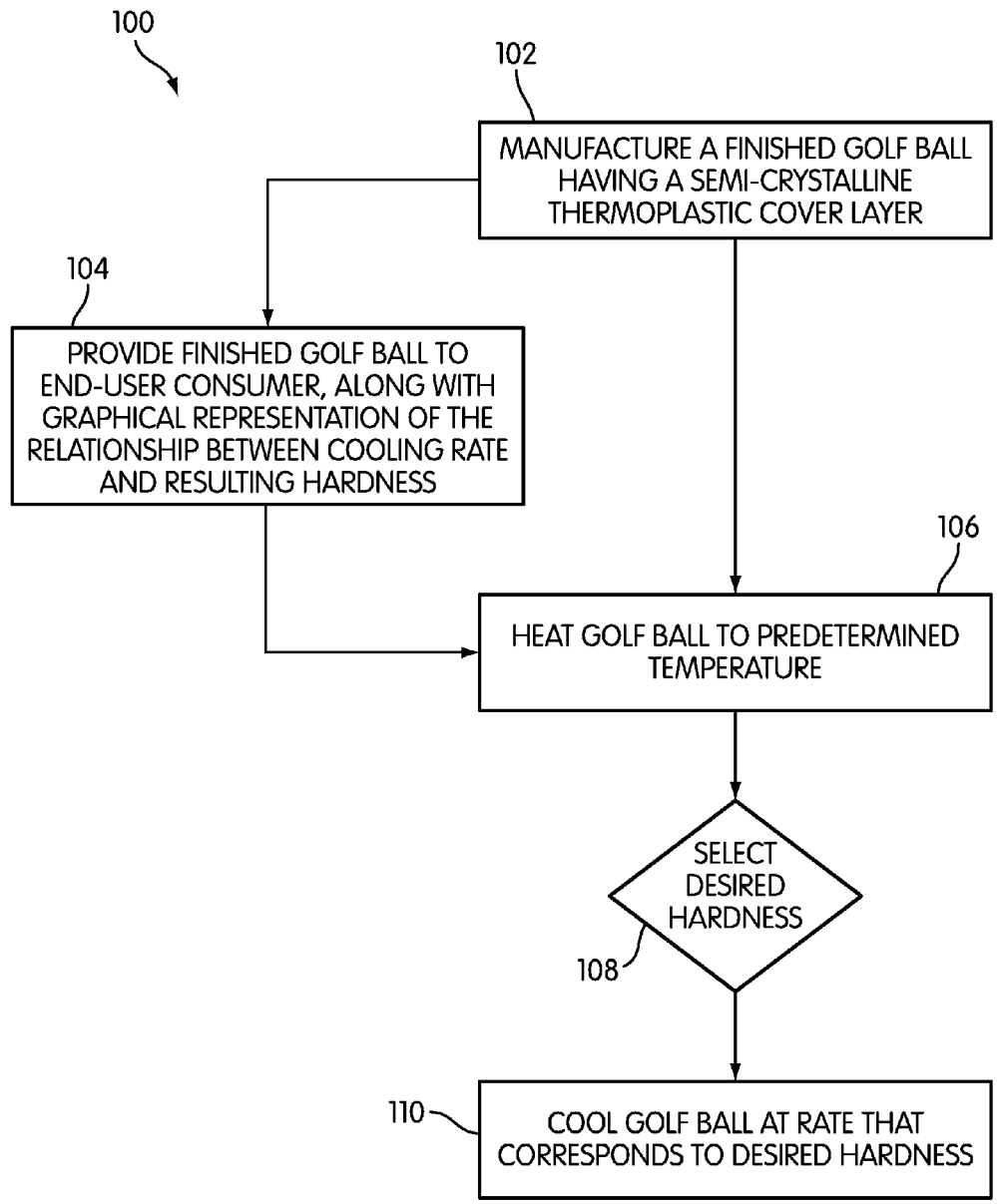
FIG. 1 is a flowchart showing the overall process of heating and cooling a golf ball.

FIG. 1 shows the overall process 100 by which a golf ball may be customized. In step 102, a finished golf ball having a semi-crystalline thermoplastic cover layer is manufactured. A finished golf ball is a golf ball that includes all layers and components necessary for the golf ball to be used by a golfer in a game of golf. The finished golf ball may be a two-piece construct, having a core and a cover layer. The finished golf ball (henceforward referred to merely as "the golf ball") may alternatively be a three-piece construct, having a core, an intermediate layer, and a cover layer. Generally, the golf ball may have any number of layers, so long as the golf ball includes at least a core and at least one cover layer substantially disposed around the core.

The cover layer on the golf ball is formed of a semi-crystalline thermoplastic polymer material. A thermoplastic polymer material is a polymer that changes phase upon heating and cooling. For example, a thermoplastic polymer that is solid at room changes to a liquid upon being heated to a temperature above a certain temperature. In contrast, a thermoset polymer does not change phase upon heating, but instead merely degrades. Generally, thermoset materials include permanently bonded cross-linkages between the long chain polymer molecules, while thermoplastic materials include few if any permanently bonded cross-linkages.

The cover layer material is a semi-crystalline thermoplastic material in particular. As used herein, the term "semi-crystalline" is used herein in the scientific sense and broadly means that the material includes both crystalline regions and amorphous regions, in any non-zero amounts. The term "semi-crystalline" as used herein therefore encompasses materials having a very low amount of crystalline regions, such as polymer materials that might otherwise be considered amorphous in various specific materials arts. Semi-crystalline materials are often referred to as having a two-phase morphology, because they include a crystalline phase and an amorphous phase. The crystalline phase is formed by alignment of the polymer molecules due to weak (i.e., non-covalent) association, such as through Van der Waals forces, dipole-dipole interactions or hydrogen bonding. Because these weak associations are physical in nature, as opposite to chemical bonds, they are thermally reversible. The fractional amount of crystallinity in the polymer is referred to as the degree of crystallinity. The degree of crystallinity can be measured on a weight basis or on a volume basis, and can be measured using a variety of techniques known in the chemical arts such as X-ray diffraction, calorimetry, density measurement, or infrared spectroscopy.

Suitable semi-crystalline thermoplastic polymer materials include any of the wide range of semi-crystalline thermoplastic polymer materials used for golf ball cover layers. In particular, suitable semi-crystalline thermoplastic polymer materials include DuPont's Surlyn™ ionomer materials, and thermoplastic polyurethane (TPU). Materials such as thermoplastic polyurethane are encompassed by the term "semi-crystalline" as used herein, because thermoplastic polyurethane includes a non-zero degree of crystallinity, even though thermoplastic polyurethane may typically be referred to as an amorphous polymer.

In step 104 of process 100 shown in FIG. 1, the finished golf ball is provided to an end-user consumer. Generally, latter steps in method 100, steps 106, 108 and 110, are performed by a party other than the party responsible for manufacturing the golf ball. The golf ball thereby undergoes after-market customization. The customization may be performed by anyone post-manufacture, such as the end-user him or herself, or by (for example) a golf pro at a golf pro shop.

The next step in the customization process 100, as shown in FIG. 1, is step 106 of heating the golf to a preselected temperature. The preselected temperature may generally be any temperature that delivers sufficient heat energy to break at least some of the weak associations between the polymer molecules in the crystalline phase of the semi-crystalline thermoplastic polymer material. The exact value of this temperature will depend on the semi-crystalline thermoplastic polymer material used in the golf ball cover layer. This heating will therefore decrease the amount of crystalline phase and increase the amount of amorphous phase, decreasing the degree of crystallinity.

In particular embodiments, the preselected temperature may be any temperature that is higher than the glass transition temperature ("$T_g$"). For example, the preselected temperature may be any temperature that is higher than the softening point of the polymer material. The softening point of a polymer material is the temperature at which a polymer material has softened to the point that a specific load indents the material to a predetermined degree. The softening point may be determined in accordance with the Vicat method, as detailed in ASTM D 1525 and ISO 306. The softening point is also a temperature at which a significant number of the crystalline domains disassociate into an amorphous phase, although the change from crystalline to amorphous phase takes place to some degree over a wide range of temperatures beginning with a lower bound of the glass transition temperature.

In other embodiments, the preselected temperature may be any temperature that is higher than the softening point and less than the melting point of the semi-crystalline thermoplastic polymer material. The melting point, $T_m$, is generally the temperature at which the polymer changes entirely from the semi-crystalline state into a viscous flow state. In other words, the melting point is the temperature at which all crystalline domains are completely disassociated, such that the polymer is only in the amorphous phase. In the range between the softening point and the melting point, the preselected temperature is sufficiently high so as to dissociate most of the crystalline domains without turning the thermoplastic polymer material into a flowable liquid. This range therefore achieves reduction of the degree of crystallinity without making the thermoplastic material difficult to handle and process.

After step 106, a desired hardness of the golf ball is selected in step 108. Generally, the hardness of a semi-crystalline thermoplastic material is proportional to the degree of crystallinity. The crystalline domains in the polymer material are physically harder than the amorphous domains, due to the crystalline close packing structure. Therefore, a greater degree of crystallinity will result in a greater hardness of the polymer material as a whole. The desired hardness of the golf ball is selected by the end-user consumer golfer, or by another person such as a golf pro, so that the golf ball will achieve desired play characteristics. For example, if the golfer intends to play on a long course the golf may select a higher hardness as the desired hardness. Alternatively, if the golfer is playing in the cold, the golf may select a lower hardness as the desired hardness.

Next, the golf ball is cooled at a preselected rate that corresponds to the selected desired hardness in step 110. Generally, the preselected rate in step 110 controls the degree of crystallinity formed in the semi-crystalline thermoplastic polymer material as the material cools. As discussed above, the degree of crystallinity decreases during heating because the heat energy causes the weak associations holding the crystalline domains together to disassociate. However, during cooling the weak associations may bring portions of the polymer molecules back into a crystalline phase. However, the polymer molecules must be able to move and bend on the molecular level in order for the polymer molecules to property align into a crystalline phase. Therefore, slowly cooling the heated semi-crystalline thermoplastic material will leave sufficient heat energy in the material for the polymer molecules to move and so align into crystalline domains. However, quickly cooling the heated material will remove that heat energy before crystalline domains can be formed.

Accordingly, the rate at which the semi-crystalline thermoplastic material cools controls the degree of crystallinity.

Figure 2:
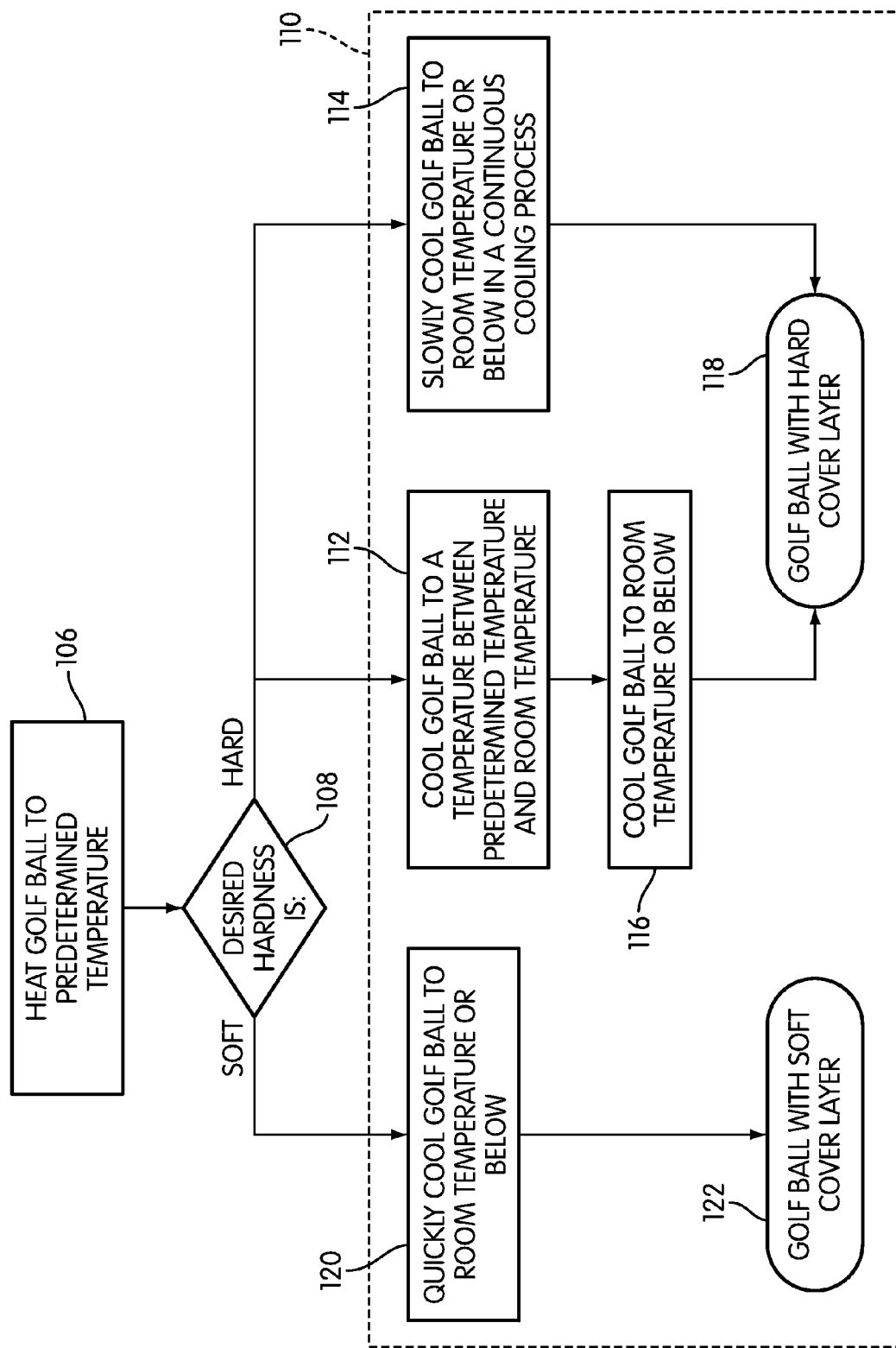
FIG. 2 is a flowchart showing several options for the preselected rate of cooling.

Step 110 is shown in greater detail in FIG. 2. In a first option, step 120, the golf ball may be quickly cooled to room temperature or a temperature below room temperature. Such quick cooling will prevent the semi-crystalline thermoplastic material from forming crystalline domains, so the resulting material will have a low degree of crystallinity. Accordingly, the hardness of the golf ball cover layer will be lower, meaning that the golf ball cover layer will be softer. Therefore, the resulting golf ball in step 122 may be used under conditions favoring a softer cover layer.

Alternatively, in step 112, the golf ball may first be cooled to a temperature that is between the preselected temperature and room temperature. Subsequently, in step 116, the golf ball may be cooled to room temperature or a temperature below room temperature. This two-step cooling process therefore uses an intermediate cooling step, step 112, to achieve a rate of cooling that is overall slower than cooling step 120.

Thirdly, in step 114, the golf ball may be slowly cooled in a one-step process.

The golf ball in step 118 therefore results from either the two-step slow cooling process, steps 112 and 116, or the one-step slow cooling process, step 114. The golf ball of step 118 has a harder cover layer, because the slow cooling has enabled the polymer molecules to align into crystalline domains, resulting in a higher degree of crystallinity.

Figure 3:
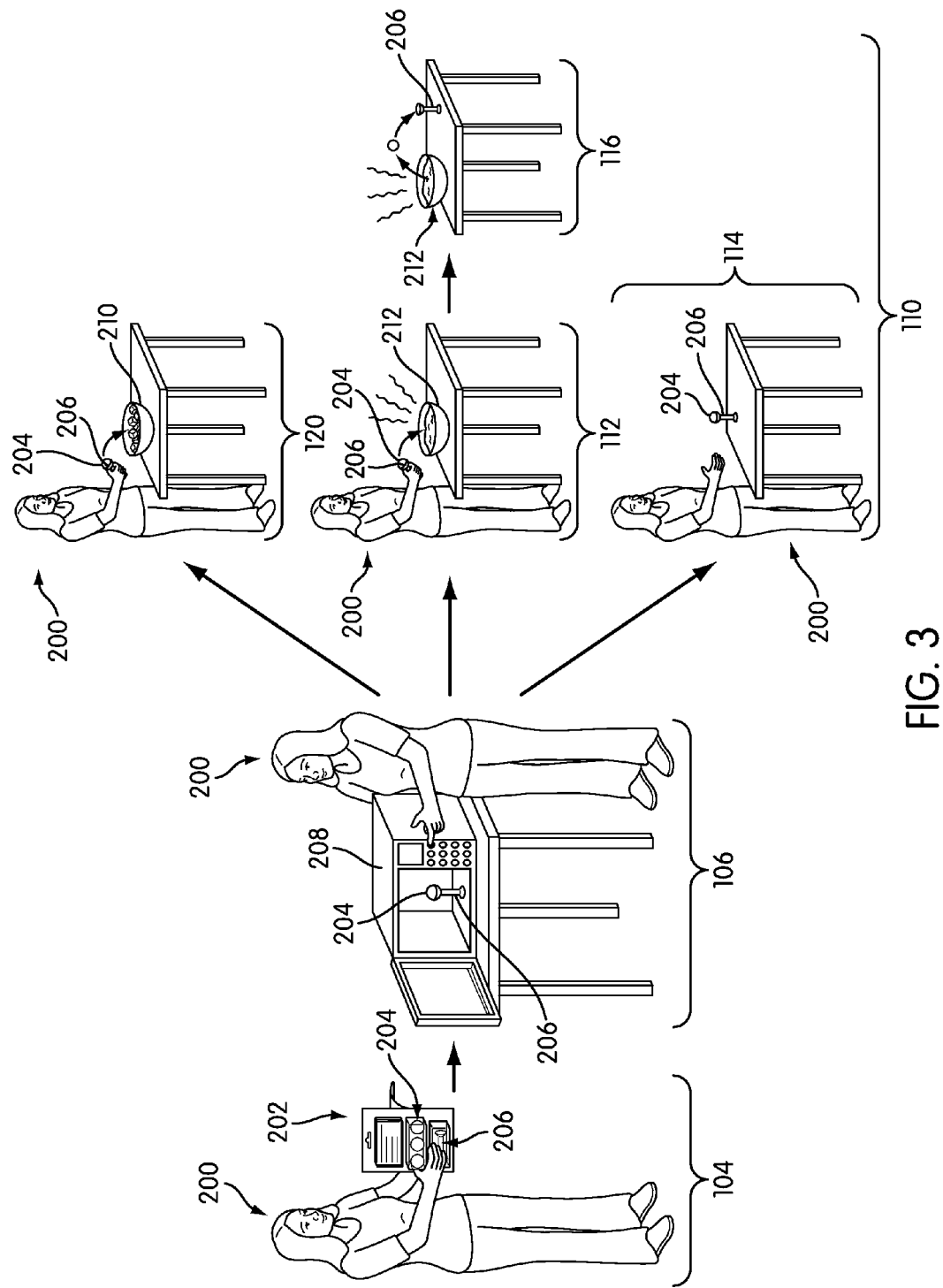
FIG. 3 shows an end-user consumer performing the heating and cooling process.

FIG. 3 shows an end-user performing the process as shown in FIGS. 1 and 2. Specifically, the end user 200 may receive a kit 202 containing at least one finished golf ball 204 in step 104. Kit 202 shown in FIG. 3 also includes a graphical representation of the relationship between various preselected cooling rates and resulting hardness of the golf ball, and a stand 206 for holding golf ball 204.

Next, in step 106, end-user 200 heats golf ball 204 to a preselected temperature using a microwave 208 by placing golf ball 204 on stand 206 inside microwave 208.

In some embodiments, the cover layer of golf ball 204 may include a microwave absorbing additive. Generally, a microwave absorbing additive turns microwaves into heat. The microwave absorbing additive in the cover layer therefore ensures that the cover layer is sufficiently heated when end-user 200 heats the golf ball using a microwave 208. Use of a microwave absorbing additive can advantageously avoid the need to microwave golf ball 204 for a long time period, which might damage other portions of the golf ball such as a rubber core. The microwave absorbing additive may be any known microwave absorbing additive, such as (for example) a glycerine or a carbon black.

Then the end-user chooses a desired hardness and selects one of the three cooling paths in step 110. If end user 200 desires a soft cover layer on the golf ball, then the end-user may perform step 120 by quenching golf ball 204 in a cold water bath 210. In a particular embodiment, the cold water bath may have a temperature of between about 4° C. and about 13° C., and golf ball 204 may be quenched for a time period of from about one minute to about five minutes. However, a variety of alternative methods of quickly cooling the golf ball are within the scope of step 120, as are known in the art of heat exchangers.

Alternatively, if end-user 200 desires a harder cover layer on golf ball 204, end-user 200 may perform steps 112 and 116 or step 114. In step 112, end-user 200 cools golf ball 204 in a warm water bath 212. The warm water bath 212 may have a temperature of between about 40° C. and about 70° C. Golf ball 204 may be placed in warm water bath 212 for a time period of from about one minute to about 10 minutes. Subsequently, after step 112, golf ball 204 may be removed from warm water bath 212 and placed on stand 206 to air cool to room temperature.

Thirdly, golf ball 204 may be allowed to slowly air cool, without an intermediate cooling step, as in step 114.

Generally, FIG. 3 shows an embodiment of how an end-user may perform the various steps in method 100 using readily available household equipment. However, each of steps 106, 120, 112 and 116, and 114 are intended to broadly encompass any heat exchange process that heats or cools the golf ball at the indicated rate so as to achieve the desired hardness. For example, the heating process may use a boiling water bath, or a hot air source such as a strong hair drier. The use of readily available household equipment makes the process easy for an end-user consumer to perform. However, larger scale heat exchange systems may be used in other embodiments, such as when the method is performed in a golf pro-shop.

Figure 4:
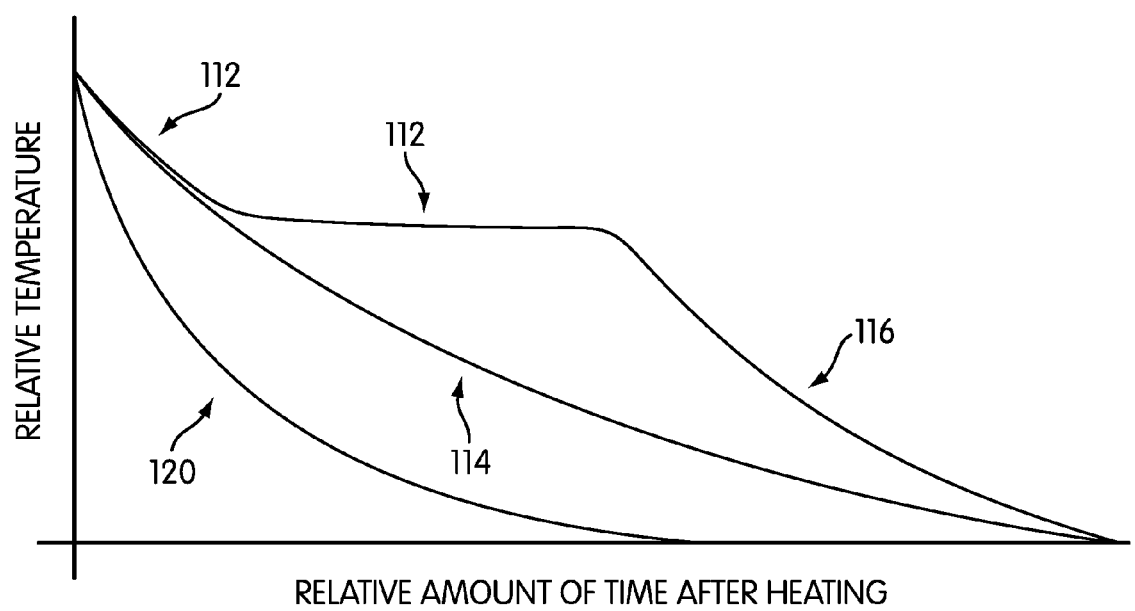
FIG. 4 is a graph of relative temperature vs. relative time for three preselected cooling rates.

To this end, FIG. 4 shows the general temperature vs. time relationship for each of the several cooling steps. Each of the temperature scale and the time scale as shown in FIG. 4 are relative, so as to broadly compare the cooling steps without reference to a specific embodiment.

Specifically, FIG. 4 shows how cooling step 120 rapid decreases the temperature, in a shorter amount of time than either of steps 114 or 112 and 116. One-step slow cooling process 114 is shown in FIG. 4 as gradually reducing the temperature of the golf ball from a preselected temperature to room temperature. Finally, two-step cooling process 112 and 116 is shown in FIG. 4 as cooling the golf ball from the preselected temperature to a temperature between the preselected temperature and room temperature, as indicated by the flat part of the curve 112, and then cooling the golf ball to room temperature in step 116.

Figure 5:
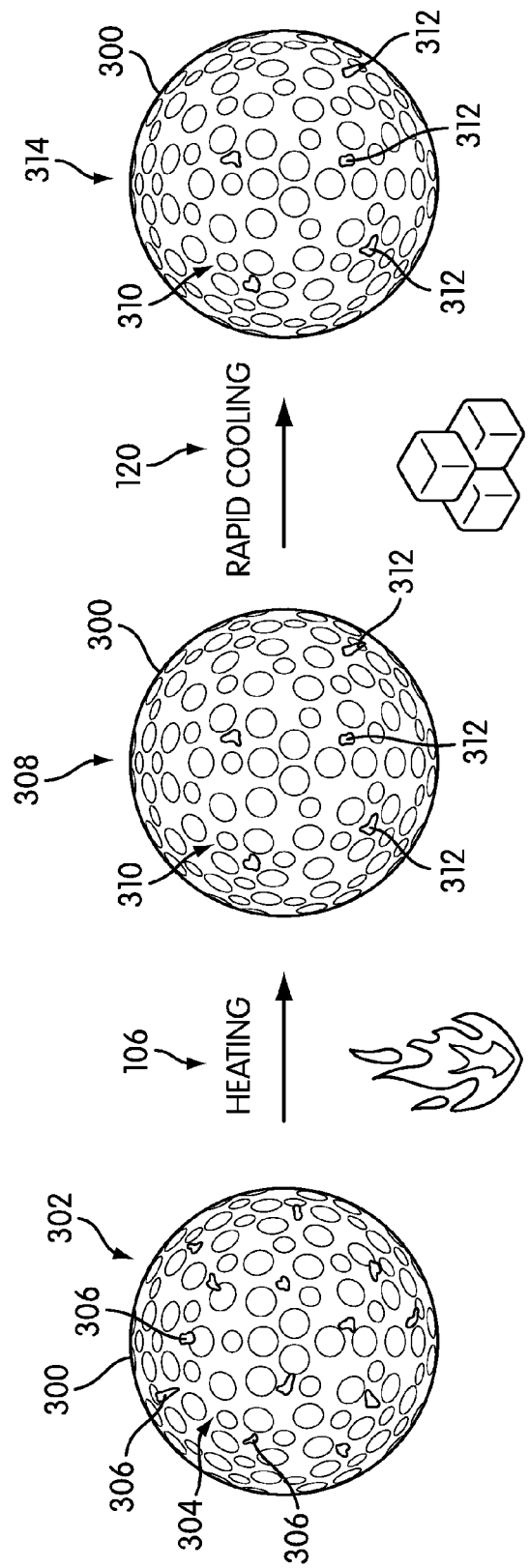
FIG. 5 shows a golf ball as it undergoes heating and then rapid.

FIG. 5 shows a representative change in degree of crystallinity as the golf ball undergoes heating step 106 and rapid cooling step 120. Specifically, golf ball 300 starts out having a cover layer in state 302, which may be the state the golf ball was manufactured in. On the cover layer are crystalline domains 306 and amorphous domains 304. Although the crystalline domains 306 are shown in FIG. 5 as being visible areas, this representation is made merely to convey the concept of the change in degree of crystallinity. In fact, the crystalline domains are on the order of microns or even nanometers, are randomly dispersed throughout amorphous phase 304, and are not visible to the naked human eye. As shown in FIG. 5, first state 302 of golf ball 300 prior to heating may include a moderate degree of crystallinity, having a medium amount of crystalline domains.

Golf ball 300 then undergoes heating step 106. As discussed above, this heating reduces the degree of crystallinity by breaking up the weak associations holding the crystalline domains together. Therefore, only a few crystalline domains 312 remain when the golf ball is in state 308 after heating.

Golf ball 300 then undergoes rapid cooling step 120, as discussed above. Because the rapid cooling removes all of the heat energy, the polymer molecules cannot align themselves so as to form new crystalline domains. In other words, rapid cooling step 120 locks the degree of crystallinity in place by setting the material into a mostly amorphous phase 310. The resulting golf ball in state 314 will therefore have a softer cover, because fewer hard crystalline domains 312 remain.

Figure 6:
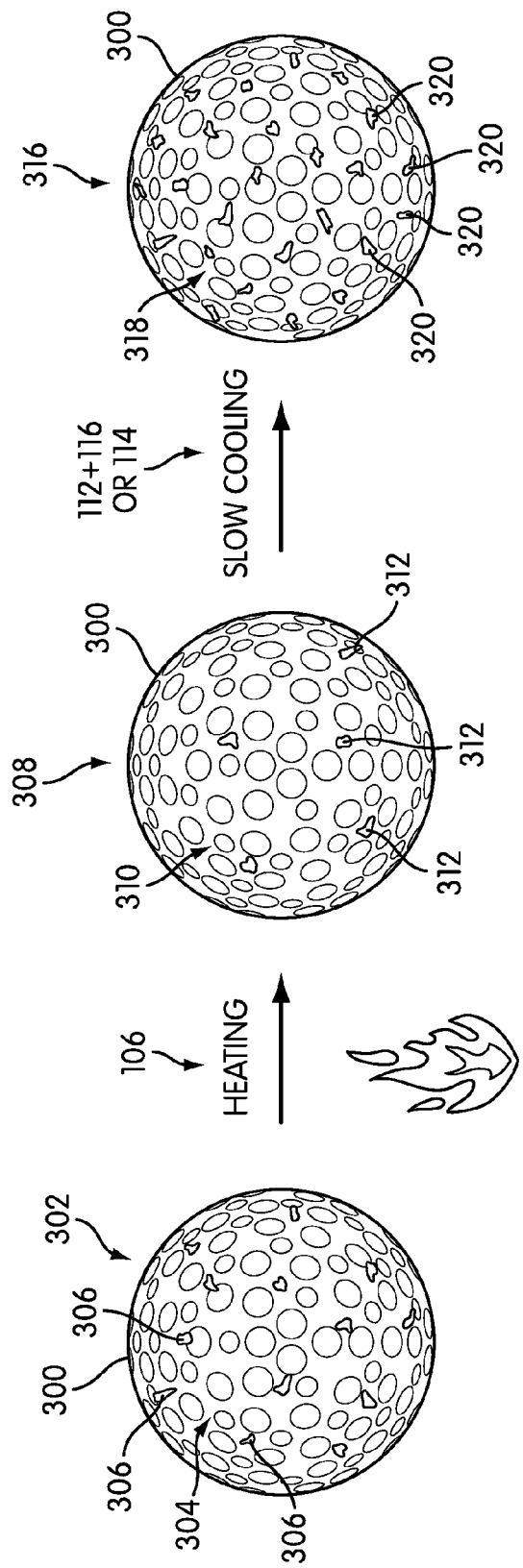
FIG. 6 shows a golf ball as it undergoes heating and then slow cooling.

Conversely, if the end-user desires a harder golf ball cover layer, FIG. 6 shows a representative change in degree of crystallinity as the golf ball undergoes heating step 106 and slow cooling (either steps 112 and 116, or step 114). Golf ball 300 again begins in state 302, with crystalline domains 306 and amorphous phase 304. Again, golf ball 300 undergoes heating step 106, which results in fewer crystalline domains 312 and larger amorphous phase 310. However, in this case, golf ball 300 is allowed to retain heat energy such that the polymer molecules can move and align themselves into crystalline domains during the gradual cooling process. Accordingly, a large number of crystalline domains 320 are formed by the conclusion of the gradual cooling step, and the amorphous phase 318 is accordingly smaller.

FIG. 7 shows a sample graphical representation of a correlation between at least one preselected rate of cooling the golf ball and a desired play characteristic exhibited by the golf ball. In the sample graphical representation, the golf ball as manufactured may have a medium hardness value of 60 on the Shore D scale. This medium hardness was discussed above with respect to golf ball 300 in FIGS. 5 and 6 as being initial state 302. The fast cooling step 120 may be described as "cold (4 to 13° C.) water quench for 1 to 5 minutes," which achieves an lower hardness value of about 57-58 on the Shore D scale. This preselected rate of cooling therefore correlates to higher spin and greater control, which may be useful during cold or wet weather (for example).

Alternatively, the slow cooling step 112 may be described as "warm (49 to 70° C.) water bath for 1 to 10 minutes." Slow cooling step 116, whereby the golf ball cools to room temperature, would necessary occur after the golf ball is removed from the warm water bath. This preselected rate of cooling may achieve an increase in hardness, of about 62-63 on the Shore D scale, for example. The resulting golf ball may therefore exhibit lower spin, but increased distance, when hit by a golf club.

Figure 8:
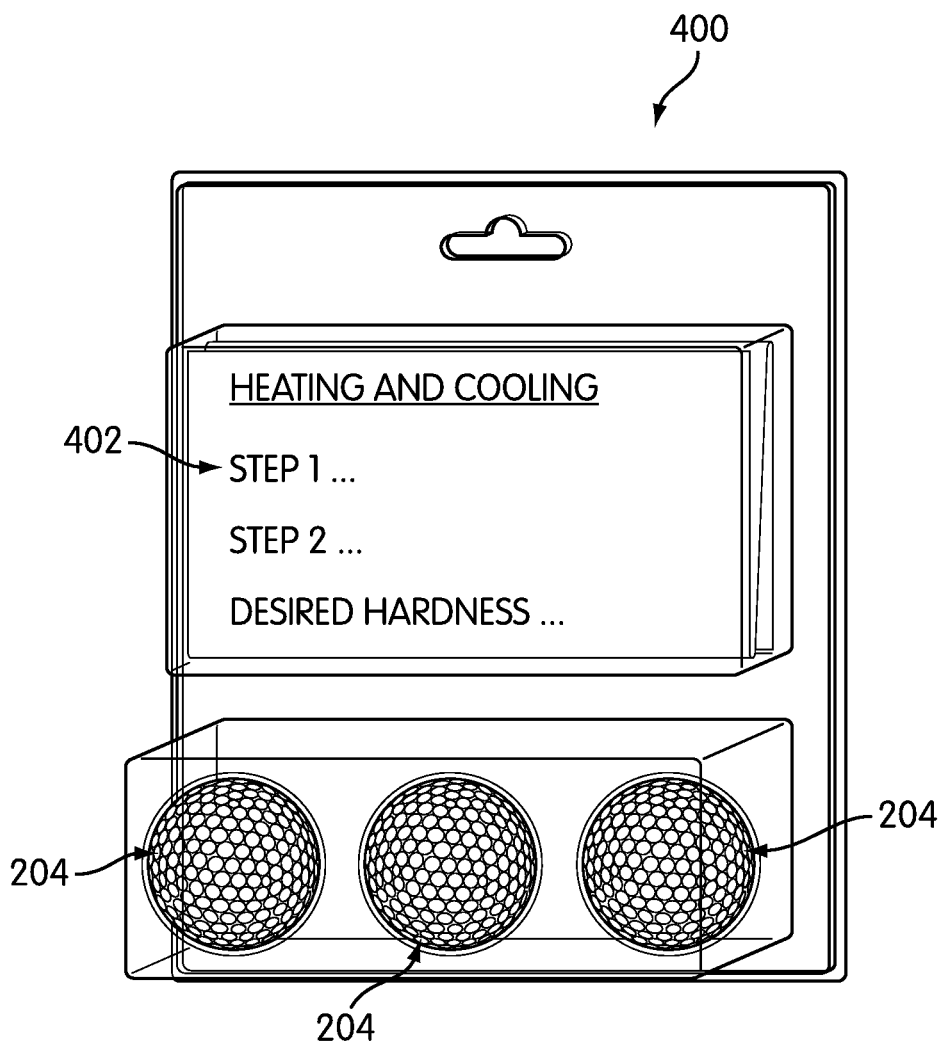
FIG. 8 shows a kit containing golf balls and a sample chart relating the preselected cooling rates to various resulting play characteristics.

FIG. 8 shows a sample kit which may be used to carry about the method as discussed variously above. Kit 400 includes at least one golf ball 204, discussed above, and a graphical representation 402 of a correlation between at least one preselected rate of cooling the golf ball (after the golf ball has been heated) and a desired play characteristic exhibited by the golf ball when the golf ball is hit bay a golf club. The graphical representation 402 may also indicate to the end-user consumer 200 to heat the golf ball to a preselected temperature, and then cool the golf ball at a preselected rate so as to cause the golf ball to exhibit a desired play characteristic.

Therefore, from the viewpoint of the manufacturer of the kit 400, the method of the present disclosure includes (1) providing a golf ball to a consumer, the golf ball comprising a core and a cover layer substantially disposed around the core, the cover layer being formed of a semi-crystalline thermoplastic polymer material; and (2) indicating to the consumer to: heat the golf ball to a preselected temperature, and then cool the golf ball at a preselected rate so as to cause the golf ball to exhibit a desired play characteristic when hit by a golf club. Each of the above variously discussed method steps may therefore be viewed from the perspective of the manufacturer, in which case each step discussed above can be viewed as "indicating to the consumer" to perform said step.

Figure 9:
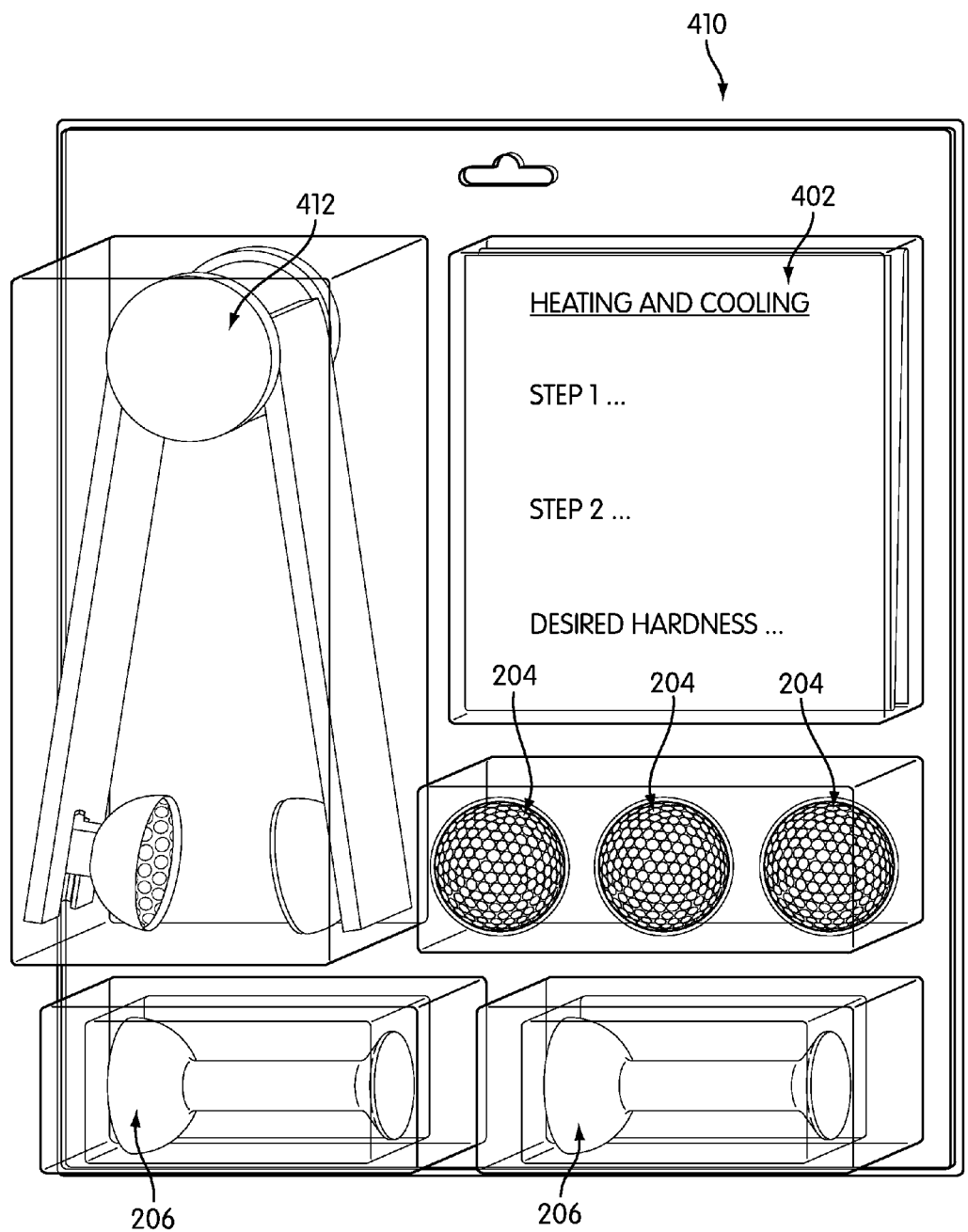
FIG. 9 shows a kit containing golf balls, a heater, two golf ball stands, and a sample chart relating the preselected cooling rates to various resulting play characteristics.

FIG. 9 shows another kit which may be used to carry out the methods of the present disclosure. Kit 410 includes at least one golf ball 204 and a graphical representation 402, as in kit 400. However, kit 410 further includes at least one stand 206 capable of holding a golf ball 204. As shown in FIG. 3, the stand 206 may be used by the end-user consumer during the heating and/or cooling steps. Finally, kit 410 also includes a heater 412. Heater 412 is a handheld clamp, and is fully described in U.S. Pat. No. 8,283,603, entitled Device for Heating a Golf Ball, and filed on Oct. 23, 2009, the disclosure of which is hereby incorporated in its entirety.

Any of the kits 202, 400 and 410 may also include an additive that aids in the heating or cooling steps. Generally, the additive may be any substance that can be added to a heat exchange medium (such as boiling or cold water) or to the golf ball itself, in order to improve an aspect of the heating or cooling step. When the additive is designed to be used in a heating step, the additive may be (for example) a water softener to remove salts from the boiling water that would otherwise negative affect the golf ball by forming deposits thereon. The additive may also be, for example, an external microwave absorbing additive that is placed on the outside of the golf ball cover layer in order to aid in the absorption of microwaves when heating step 106 uses a microwave. More generally, the additive may be (for example) a purified high specific heat liquid, such that a consumer may heat or cool the golf ball using the purified high specific heat liquid instead of water.

Accordingly, the present method and systems of kits allows aftermarket customization of a golf ball. An end-user, or other person, may perform the method on a golf ball so as to achieve a desired play characteristic, and thereby avoid the need to purchase multiple sets of golf balls having different inherent immutable play characteristics. The customization may be repeated multiple times, so as to change the same golf ball from hard to soft (or visa versa) and back again as many times as an end-user may desire. From the perspective of a manufacturer, the method of providing a golf ball and indicating to the user allows the manufacturer to provide a superior system for customizing golf balls to their customers.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A method of customizing a golf ball, the method comprising the steps of:
    (1) providing a golf ball comprising a core and a cover layer substantially disposed around the core, the cover layer being formed of a semi-crystalline thermoplastic polymer material;
    (2) heating the golf ball to a preselected temperature; and
    (3) cooling the golf ball at a preselected rate so as to control the degree of crystallinity formed in the semi-crystalline thermoplastic polymer material;
    wherein the step of heating the golf ball comprises heating the golf ball to a temperature that is greater than the softening point and less than the melting point of the semi-crystalline thermoplastic polymer material.

2. The method of claim 1, wherein the step of cooling the golf ball comprises quenching the golf ball in a cold water bath.

3. The method of claim 2, wherein the step of cooling the golf ball comprises quenching the golf ball in a cold water bath having a temperature of between about 4° C. and about 13° C. for a time period of from about one minute to about five minutes.

4. The method of claim 1, wherein the step of cooling the golf ball comprises:
    (3a) first cooling the golf ball to a temperature that is between the preselected temperature and room temperature; and then
    (3b) cooling the golf ball to room temperature or below.

5. The method of claim 4, wherein the step of cooling the golf ball comprises:
   (3a) cooling the golf ball in a warm water bath having a temperature of between about 40° C. and about 70° C. for a time period of from about one minute to about 10 minutes; and then
   (3b) cooling the golf ball to room temperature or below.

6. The method of claim 1, wherein the semi-crystalline thermoplastic polymer material comprises thermoplastic urethane.

7. The method of claim 1, wherein the cover layer includes a microwave absorbing additive.

8. A method of customizing a golf ball, the method comprising the steps of:
   (1) providing a golf ball comprising a core and a cover layer substantially disposed around the core, the cover layer being formed of a semi-crystalline thermoplastic polymer material;
   (2) heating the golf ball to a preselected temperature; and
   (3) cooling the golf ball at a preselected rate so as to control the degree of crystallinity formed in the semi-crystalline thermoplastic polymer material;
   wherein the step of cooling the golf ball comprises quenching the golf ball in a cold water bath.

9. A method of customizing a golf ball, the method comprising the steps of:
   (1) providing a golf ball comprising a core and a cover layer substantially disposed around the core, the cover layer being formed of a semi-crystalline thermoplastic polymer material;
   (2) heating the golf ball to a preselected temperature; and
   (3) cooling the golf ball at a preselected rate so as to control the degree of crystallinity formed in the semi-crystalline thermoplastic polymer material;
   wherein the step of cooling the golf ball comprises quenching the golf ball in a cold water bath having a temperature of between about 4° C. and about 13° C. for a time period of from about one minute to about five minutes.

10. A method of customizing a golf ball, the method comprising the steps of:
   (1) providing a golf ball comprising a core and a cover layer substantially disposed around the core, the cover layer being formed of a semi-crystalline thermoplastic polymer material;
   (2) heating the golf ball to a preselected temperature; and
   (3) cooling the golf ball at a preselected rate so as to control the degree of crystallinity formed in the semi-crystalline thermoplastic polymer material;
   wherein the step of cooling the golf ball comprises:
   (3a) cooling the golf ball in a warm water bath having a temperature of between about 40° C. and about 70° C. for a time period of from about one minute to about 10 minutes; and then
   (3b) cooling the golf ball to room temperature or below.

* * * * *